US012252306B2

(12) United States Patent
Ronconi

(10) Patent No.: US 12,252,306 B2
(45) Date of Patent: Mar. 18, 2025

(54) INTERLOCKING PACKAGING ARTICLE AND ITS FORMING METHOD AND APPARATUS

(71) Applicant: EMS Group S.p.A., Montecchio Emilia (IT)

(72) Inventor: Giovanni Ronconi, Montecchio Emilia (IT)

(73) Assignee: EMS GROUP S.P.A., Montecchio Emilia (IT)

(*) Notice: Subject to any disclaimer, the term of this patent is extended or adjusted under 35 U.S.C. 154(b) by 539 days.

(21) Appl. No.: 17/609,794

(22) PCT Filed: May 11, 2020

(86) PCT No.: PCT/IB2020/054429

§ 371 (c)(1),
(2) Date: Nov. 9, 2021

(87) PCT Pub. No.: WO2020/229998

PCT Pub. Date: Nov. 19, 2020

(65) Prior Publication Data

US 2022/0219859 A1 Jul. 14, 2022

(30) Foreign Application Priority Data

May 10, 2019 (IT) ...................... 102019000006772

(51) Int. Cl.

*B65D 5/20* (2006.01)
*B31B 50/26* (2017.01)
*B65D 5/30* (2006.01)

(52) U.S. Cl.

CPC ............. *B65D 5/308* (2013.01); *B31B 50/26* (2017.08)

(58) Field of Classification Search

CPC ........ B65D 5/22; B65D 5/302; B65D 5/6661; B65D 5/003; B65D 5/28; B65D 5/443;
(Continued)

(56) References Cited

U.S. PATENT DOCUMENTS

| | | | | |
|---|---|---|---|---|
| 4,244,472 A | 1/1981 | Brown | | |
| 5,236,122 A * | 8/1993 | Ballard | B65D 5/30 | 229/173 |
| 2009/0308785 A1* | 12/2009 | Philips | B65D 5/003 | 206/508 |

FOREIGN PATENT DOCUMENTS

| | | |
|---|---|---|
| DE | 1028872 * | 4/1958 |
| DE | 1028872 B | 4/1958 |

(Continued)

OTHER PUBLICATIONS

DE 1028872 English Translation (Year: 1958).*

*Primary Examiner* — King M Chu
(74) *Attorney, Agent, or Firm* — Carmel Patent Agency; Robert Ballarini

(57) ABSTRACT

Packaging article, made by means of a sheet of folding material, the article including a base wall, sidewalls connected with the edges of the base wall by folding lines. Two preferably opposite sidewalls include an extension flap, which protrudes from ends of the sidewalls and is connected thereto by a folding line. The extension flap folds, arranging itself in face-to-face relationship with a portion of the adjacent sidewalls. The packaging article includes connection means for fixing the extension flap on the portion of the adjacent sidewalls. The connection means include a male element and a female element configured in such a way that a portion of the male element, when inserted into the female element, protrudes towards the outside of the formed packaging article.

11 Claims, 7 Drawing Sheets

(58) Field of Classification Search
CPC ................ B65D 5/0015; B65D 5/0254; B65D 81/3453; B65D 1/34; B31B 2100/00
USPC .................. 206/557, 807; 229/147, 102, 178
See application file for complete search history.

(56) References Cited

FOREIGN PATENT DOCUMENTS

| | | | |
|---|---|---|---|
| FR | 2611585 | A1 | 9/1988 |
| NZ | 547861 | A | 5/2010 |
| WO | 2005051772 | A2 | 6/2005 |

* cited by examiner

INTERLOCKING PACKAGING ARTICLE AND ITS FORMING METHOD AND APPARATUS

INVENTIVE FIELD

The present invention is included in the field of packaging articles such as trays or caps obtained from spread out or die-cut sheets, preferably made of cardboard, by folding suitable walls and flaps of said die-cut sheet.

BACKGROUND

Packaging articles are known in the state of the art, in particular trays or caps with flaps, suitable for different uses, such as for example for containing products packages.

In particular, in the following reference will be often made to trays used to contain bottles or other containers and used to facilitate their palletization and storage, without this being limiting for the invention. Reference will also be made to trays used as caps adapted to contain bottles or other containers and used to facilitate their palletization and storage.

The aforesaid trays or caps preferably have dimensions similar to those of a pallet or a fraction/portion of the pallet on which the products are to be stored.

Said trays or caps are preferably obtained from spread out cardboard sheets, also called die-cut sheets which, after exiting the die-cutting press, are suitably folded manually or by means of machines for forming the trays or caps.

In the following, we will talk about the tray, but said term also refers to the tray used as a cap, that is the cap.

The die-cut sheet generally comprises a base wall from which walls and flaps extend on which creasing/fold lines are defined to fold them and create the rimmed tray.

Tray forming machines generally provide for a warehouse in which the die-cut sheets are stacked and from which they are withdrawn to be placed inside the forming area where a plurality of forming walls are shaped in such a way as to obtain those folds from the spread out sheet defined by the creasing/fold lines previously made during die-cutting.

At the end of said operation, which is similar to a deep drawing operation, the flaps which rest on the adjacent walls of the tray are fixed to said walls generally by means of glue or staples in order to maintain the closed shape of a rimmed tray.

Said fixing systems by means of glue or staples, have the disadvantage of being expensive systems as they require to equip the machines for forming trays with complex equipment.

For example, the forming machines which provide for fixing the tray by gluing include melting devices for preparing the glue, applicators for distributing the glue in the gluing points and relative pipes, generally heated, for conveying the glue from the melter to the applicators.

In addition to the complexity and cost of these equipment, the management cost must also be considered and in particular in terms of energy for their operation, but also in terms of maintenance and glue supply.

Likewise also the forming machines which provide for fixing the tray by means of staples, require gun devices generally supplied with compressed air for the application of said staples. Also in this case, in addition to the cost of the equipment, its cost of energy management, maintenance, etc. is added.

Said fixing system also presents a problem linked to the risk of contaminating the product that is contained and stored in the tray. In fact said staples could fall for example inside said containers.

Furthermore, it should be noted that the aforesaid tray closing systems involve difficulties in the recycling of the material, once the cycle of use of the tray is finished, since the glue or the staples must be separated from the cardboard.

In the state of the art, tray interlocking systems are also known.

These systems are little used today, because they are made with complex interlocks that make it difficult to automate the closure of the tray inside forming machines.

Known interlocking systems are also made in such a way that they create overall encumbrances towards the inside of the formed tray.

This hinders the correct insertion of the containers in said trays.

In fact, once the tray has been formed, the containers, for example bottles or vases, are arranged inside it and placed on the base wall of the tray so as to form a layer of containers retained by the walls of the tray itself. The containers possibly occupy the entire base wall of the tray, making the most of its surface, in order to guarantee optimized storage both in terms of space and stability.

The presence of interlocking elements that protrude towards the inside of the tray can prevent the insertion of the container, generating falls of the article itself and instability of the layer.

Known interlocking systems also hinder the correct positioning of the cap on the containers.

In fact, once the cap is formed, it is placed above a layer of containers such as bottles or jars which are therefore retained in position by the walls of the cap itself. The containers, particularly if wide-mouthed jars, possibly occupy the entire base wall of the cap, making the most of its surface, in order to guarantee optimized storage both in terms of space and stability. The presence of interlocking elements which protrude towards the inside of the cap can prevent the insertion of the cap on the layer of containers, generating falls of the article itself and instability of the layer.

On the contrary, trays or caps made using glue or staple fixing systems, have an inner surface without obstructions or obstacles to the insertion of the containers.

However, the interlocking fixing system of the tray or cap has the big advantage that for its closure and fixing it does not require forming machines equipped with complex equipment, with high purchase, management and maintenance costs.

SUMMARY

The technical problem underlying the present invention is that of making available a packaging article which is structurally and functionally designed to overcome one or more of the limits set out above with reference to the known prior art.

In the context of the aforesaid problem, a main object of the invention is that of providing a packaging article which allows to keep an internal perimeter free from encumbrances.

A further object of the invention is also that of making available to the art a packaging article as part of a simple rational solution which, for manufacturing it, does not require complex equipment, with high purchase, management and maintenance costs.

These and other objects are reached by the characteristics of the invention as set forth in the independent claims. The dependent claims outline preferred and/or particularly advantageous aspects of the invention.

In particular, the present invention makes available a packaging article in particular made by means of a sheet of foldable material; said article comprising a base wall and sidewalls connected with the edges of said base wall by folding lines, wherein at least two preferably opposite sidewalls comprise an extension flap which protrudes from each end of said sidewalls and is connected thereto by a fold line, whereby the extension flap folds arranging itself in face-to-face relationship with a portion of the adjacent sidewalls.

Said packaging article comprises connection means for fixing the extension flap on the portion of the adjacent sidewalls, wherein said connection means comprise a male element and a female element configured in such a way that a portion of the male element, when inserted into the female element, protrudes towards the outside of the formed packaging article.

Thanks to this solution, the formed packaging article does not have protruding elements, that is, inside the base wall delimited by the walls, there are no elements that can hinder the insertion of the containers.

In fact, the male element of the interlocking means faces towards the outside of the packaging article, that is, towards the outside of the sidewalls.

Another aspect of the invention is that of making available a packaging article, in which the flap is fixed to the portion in such a way that the flap rests on the portion, remaining outside the packaging article. Preferably the flap is fixed to the portion so that the inner face of the flap, that is, the one facing the inside of the packaging article, rests on the outer face of the portion, that is, facing towards the outside of the packaging article.

Thanks to this solution it is possible to guarantee an easy insertion of the containers into the tray and/or cap formed, since there are no obstacles inside. In fact, the flaps are also external to the perimeter defined by the sidewalls.

To avoid having encumbrances inside the packaging article, the female element of the connection means is preferably formed on the extension flap, while the male element is preferably formed in the portion of the sidewalls.

A further advantage of the invention is that of enabling the formation of the packaging article without requiring complex and expensive methods or equipment for connecting the flaps to the sidewalls.

In fact, the method for manufacturing a packaging article by means of a sheet of foldable material provides for folding the sidewalls along fold lines and folding, the extension flaps which protrude from the ends of said sidewalls, arranging said extension flaps in face-to-face relationship with a portion of the adjacent sidewalls.

Said method provides for fixing each extension flap on the portion by exerting a thrust action on the connection means of the packaging article, with a movement directed from the inside towards the outside of the packaging article, and inserting the male element inside the female element so that a portion of said male element protrudes from the female element, towards the outside of the packaging article.

Likewise, the apparatus for manufacturing a packaging article, by means of a sheet of foldable material, provides forming means for folding the sidewalls along fold lines and folding, along a fold line, the extension flaps which protrude from the ends of said sidewalls, arranging said extension flaps in face-to-face relationship with a portion of the adjacent sidewalls.

Said apparatus provides for fixing each extension flap on the portion by means of thrust devices which act on the connection means of the packaging article, inserting the male element inside the female element, by means of a movement directed from the inside towards the outside of the packaging article so that a portion of said male element protrudes from the female element towards the outside of the packaging article.

Said objects and advantages are all achieved by the packaging article and relative method and forming apparatus, object of the present invention, which is characterized by what is provided in the following claims.

BRIEF DESCRIPTION OF THE DRAWINGS

This and other features will be more apparent from the following description of some of the embodiments, illustrated purely by way of non-limiting example in the accompanying drawings.

DETAILED DESCRIPTION OF THE PREFERRED EMBODIMENTS

Figure 1:
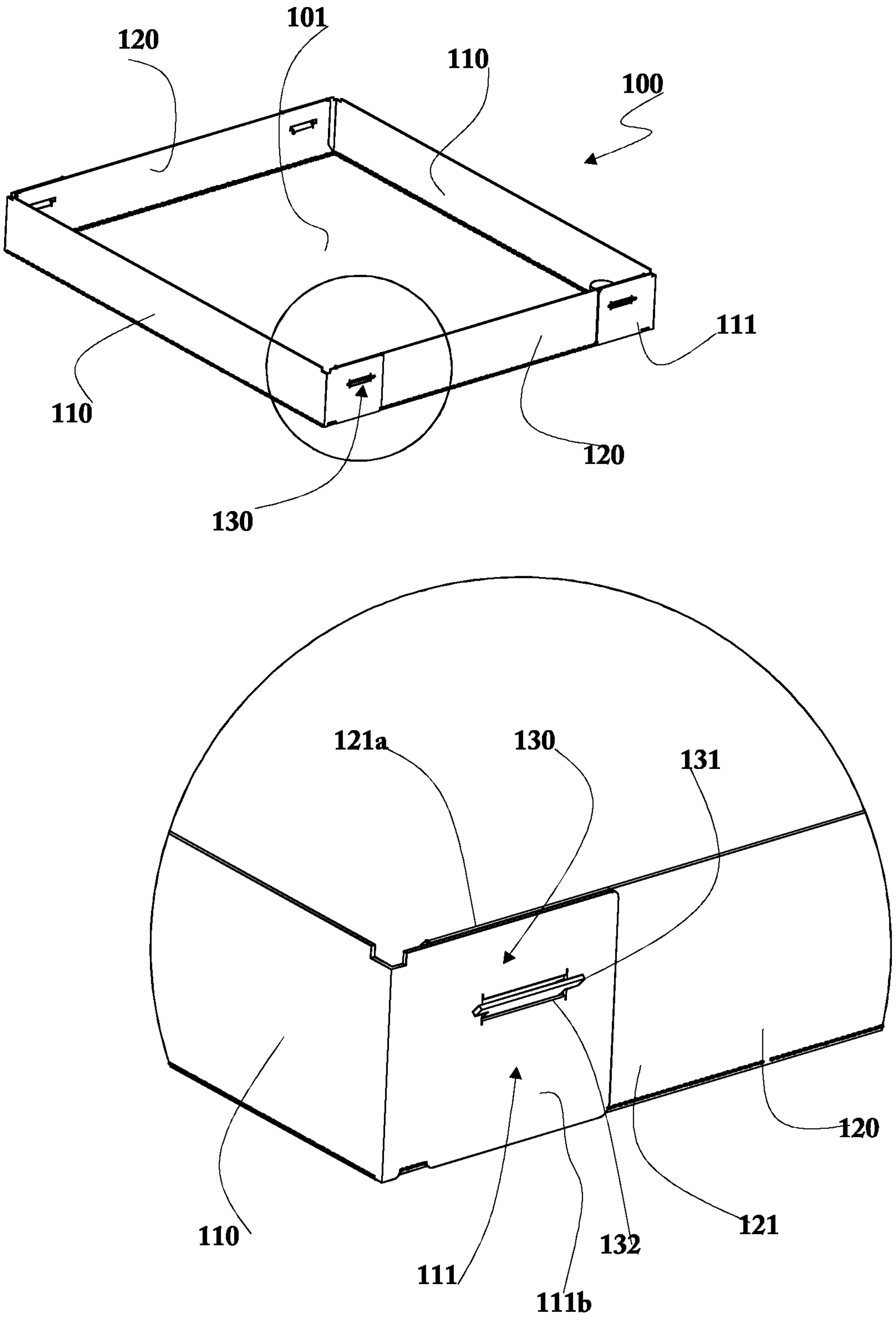
FIG. 1: illustrates an axonometric view of a packaging article formed according to the invention.

With particular reference to FIG. 1, a packaging article 100 is shown, in particular a tray 200 and/or cap 300, in its closed configuration, that is, formed and ready to receive, for example, the containers to be stored.

In the following, for simplicity's sake the talk will be about packaging article 100 to indifferently indicate a tray 200, or a cap 300.

Said packaging article 100 is made by means of a sheet 400 of foldable material which will be also called spread out die-cut sheet.

For example, cardboard sheets are generally widely used as this is a material with adequate resistance characteristics to support layers of containers arranged one above the other, to form a pallet.

In addition, cardboard is an easily recyclable and biodegradable material once the cycle of use of the packaging article 100 is finished.

An example of cardboard that can be used is corrugated cardboard.

Technically, corrugated cardboard is a sandwich consisting of two sheets of flat cardboard and one or more sheets of corrugated cardboard held together by adhesives. If there are two or more corrugated cardboard sheets, another flat cardboard sheet is placed therebetween. Hence, this is called corrugated cardboard with single, double wave etc. Each of the elements that make up a certain type of corrugated cardboard can be different in terms of material, thickness and weight and together with the others it influences the characteristics of the finished product.

Said packaging article 100 comprises a base wall 101, sidewalls 110, 120 connected with edges 102 of said base wall 101 by fold lines 103.

Said fold lines 103 or creasing lines are made during the die-cutting step of the spread out sheet 400 and will be used to define the correct positions in which the sheet 400 must be folded to make the closed or formed packaging article 100.

In particular in the sector of palletizing glass bottles or jars, where trays 200 and/or caps 300 are widely used for palletizing said containers, the base wall 101 has a substantially rectangular shape.

The pallet is generally composed of the superposition of several trays 200 and/or caps 300, wherein each tray 200 and/or cap 300 contains a layer of containers/packages. The size of the base wall 101 of the tray 200 and/or cap 300 is substantially similar to that of the pallet located on the base wall of the pallet which for example can be 1000×1200 mm or 800×1200, etc.

Alternatively for storage needs, the size of the base wall 101 can also be a portion or fraction of the pallet which is located at the base wall of the pallet.

Said base wall 101 preferably has chamfered corners 104, reducing the presence of sharp edges in such a way as to facilitate the subsequent packaging steps of the pallet, known to a person skilled in the art.

In accordance with the aforesaid purposes, the packaging article 100 has two opposite sidewalls 110 and two opposite sidewalls 120.

A preferred embodiment provides that the preferably opposite sidewalls 110 comprise an extension flap 111 which protrudes from one end 112 of said sidewalls 110 and connected thereto by a fold line 113.

By means of said fold line 113, during the step of forming from spread out sheet 400 to closed packaging article 100, the extension flap 111 folds, arranging itself in face-to-face relationship with a portion 121 of the adjacent sidewalls 120.

Indifferently, the extension flaps 111 can be included in the sidewalls 120 and in this case they will bend in a face-to-face relationship with a portion of the adjacent sidewalls 110.

Figure 2:
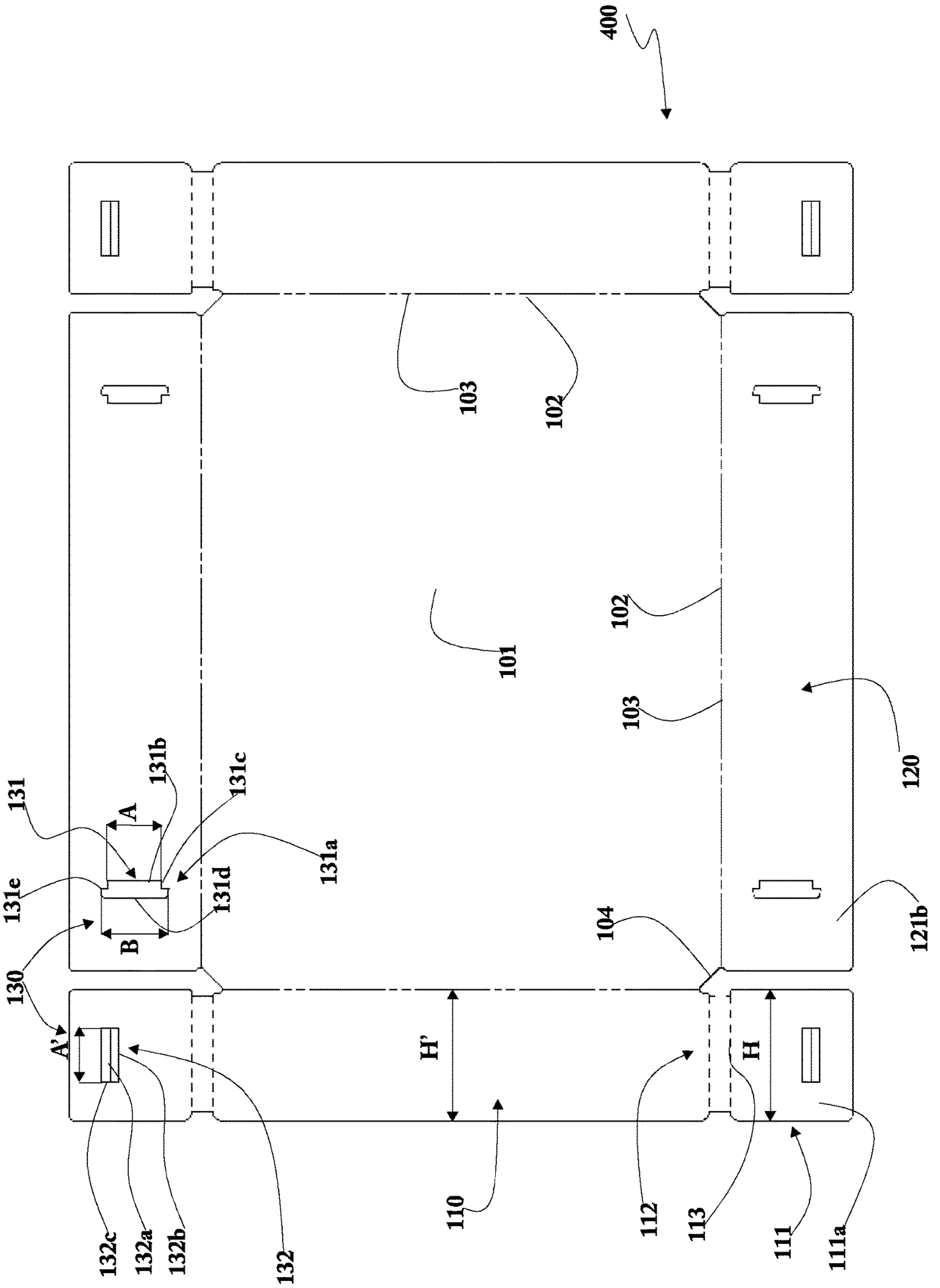
FIG. 2: illustrates a die-cut spread out sheet for manufacturing a packaging article according to the invention.

The fold line 113, as shown in FIG. 2, can also be more than one in order to optimize the face-to-face superposition of the extension flap 111 with the portion 121.

According to a feature of the invention, the sidewalls 110, 120 have a substantially rectangular shape and preferably all have the same height H'.

Furthermore, the flap 111 preferably has a height H equal to or smaller than the height H' of the sidewalls 110, 120.

Furthermore, the fold line 113 of the extension flap 111 is preferably substantially orthogonal to the base wall 101 when the packaging article 100 is closed or formed.

The flap 111, as well as the sidewalls 110 and 120, can have chamfers, recesses, protrusions and dimensions that an expert in the sector is able to define according to the folding and die-cutting needs both to optimize the use of the material that constitutes the sheet 400 and to optimize the forming of the tray 200. Furthermore, also the folding of the extension flap 111 can take place by means of several fold lines 113, so as to define a chamfered edge as an alternative to the one of 90° shown in the figures.

It is understood however that what is described above has a value of non limiting example, therefore, possible variants of detail that may be necessary for technical reasons and/or functional, are considered from now falling within the same protective scope defined by the claims indicated below.

According to an aspect of the invention, said packaging article 100 comprises connection means 130 for fixing the extension flap 111 on the portion 121 of the adjacent sidewalls 120.

The fixing is preferably of the removable type. Said connection means 130 are therefore configured to allow the engagement/disengagement of the extension flap 111 from the portion 121, unlike the fixing systems with glue or staples whose fixing can be defined as permanent.

In a formulation of the present invention, said interlocking means 130 comprise a male element 131 and a female element 132 arranged in such a way that a portion of the male element 131, when inserted into the female element 132, protrudes towards the outside of the packaging article 100.

Therefore, towards the inside of the closed packaging article 100, i.e. inside the base wall 101 delimited by the walls 110, 120, there are no protruding elements that can hinder the insertion of the containers, since the male element 131 of the interlocking means 130 faces towards the outside of the packaging article 100, that is towards the outside of the sidewalls 120.

In fact, the containers, for example bottles or jars, standing on the base wall 101 of the tray 200, generally form a layer, possibly occupying the entire base wall 101 of the tray 200 in order to make the most of its surface. This guarantees optimized storage both in terms of space and stability.

The presence of connection means 130 which protrude towards the inside of the tray 200 hinders the insertion of the container generating possible falls of the container itself and instability of the layer.

Similarly, when the packaging article 100 is used as a cap 300, this is placed above a layer of containers, for example bottles or jars which are therefore retained in position by the walls of the cap 300 itself. The containers, particularly if wide-mouthed jars, possibly occupy the entire base wall 101 of the cap 200, making the most of its surface, so as to guarantee optimized storage both in terms of space and stability. The presence of connection means 130 which protrude towards the outside of the cap 300 facilitates its insertion on the container layer, avoiding falls of the containers and instability of the layer.

To optimize said result, a possible embodiment of the packaging article 100 provides that the flap 111 is fixed to the portion 121 so that the flap 111 rests on the portion 121, remaining outside the packaging article 100.

In particular, the flap 111 is fixed to the portion 121 in such a way that the inner face 111*a* of the flap 111, i.e. facing the inside of the packaging article 100, rests on the outer face 121*a* of the portion 121, i.e. facing towards the outside of the packaging article 100.

Figure 5:
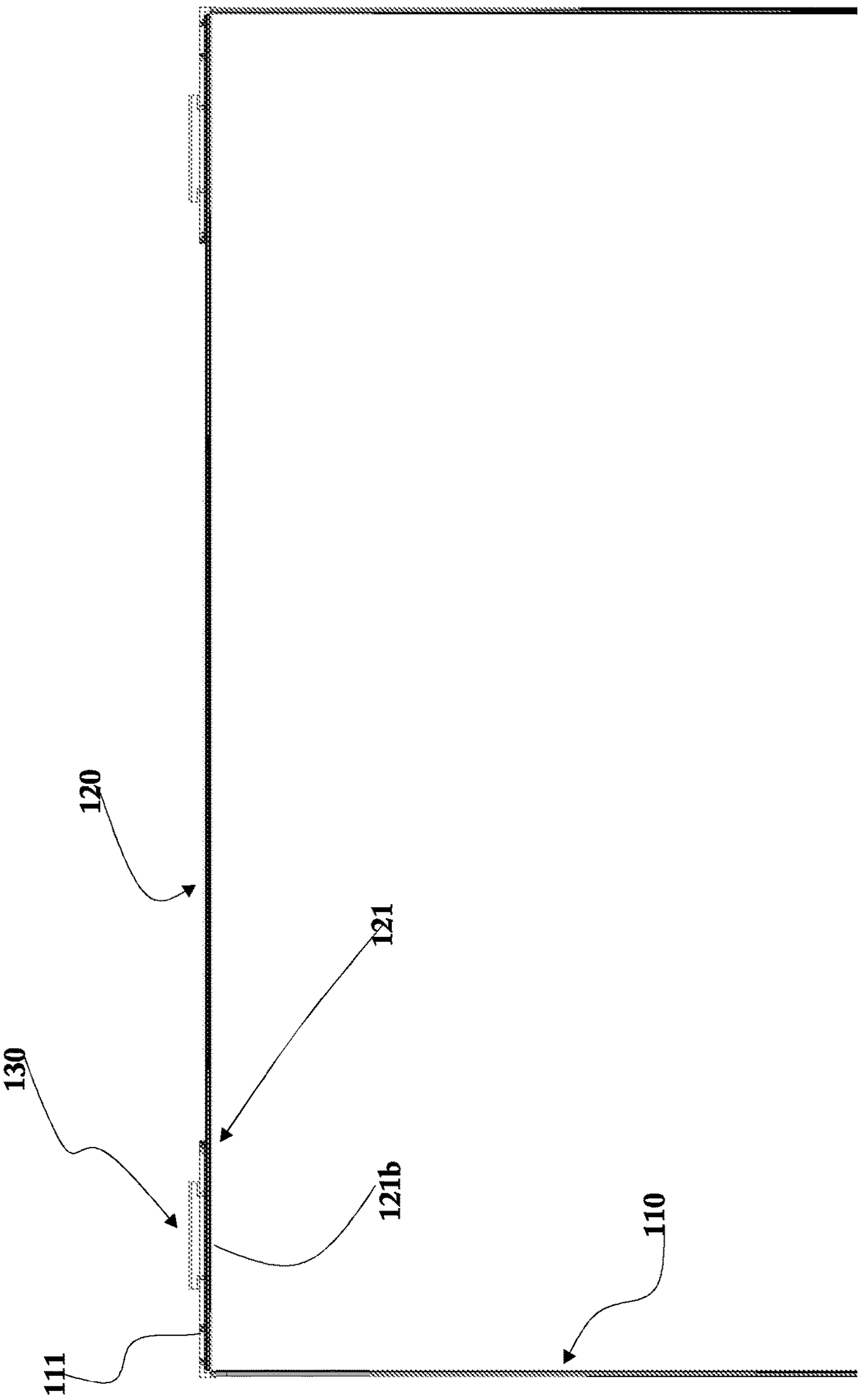
FIG. 5: shows a view from above of a packaging article formed according to the invention.
Figure 6:
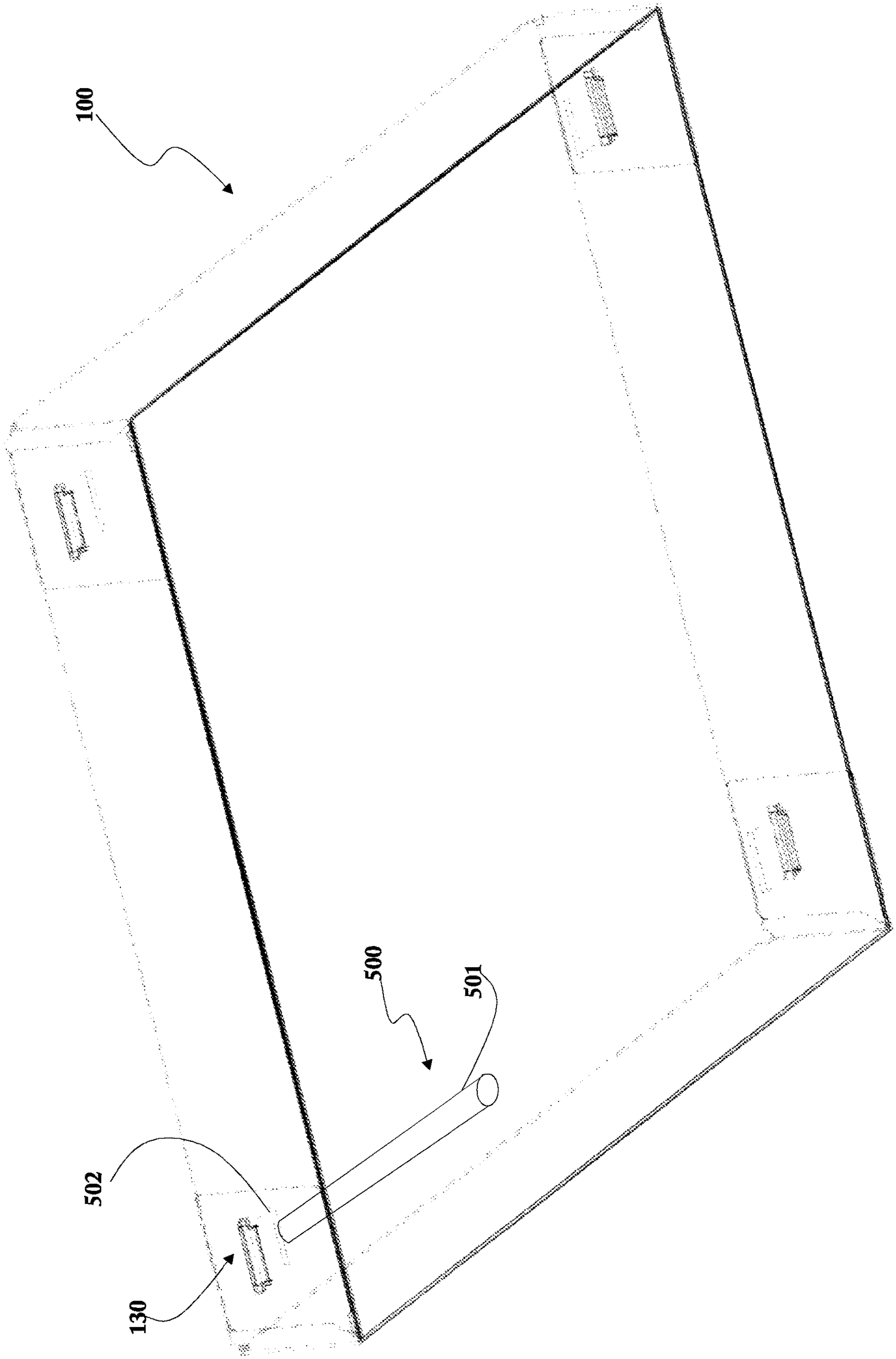
FIG. 6: illustrates an axonometric view of a packaging article with thrust devices for the forming thereof.
Figure 7:
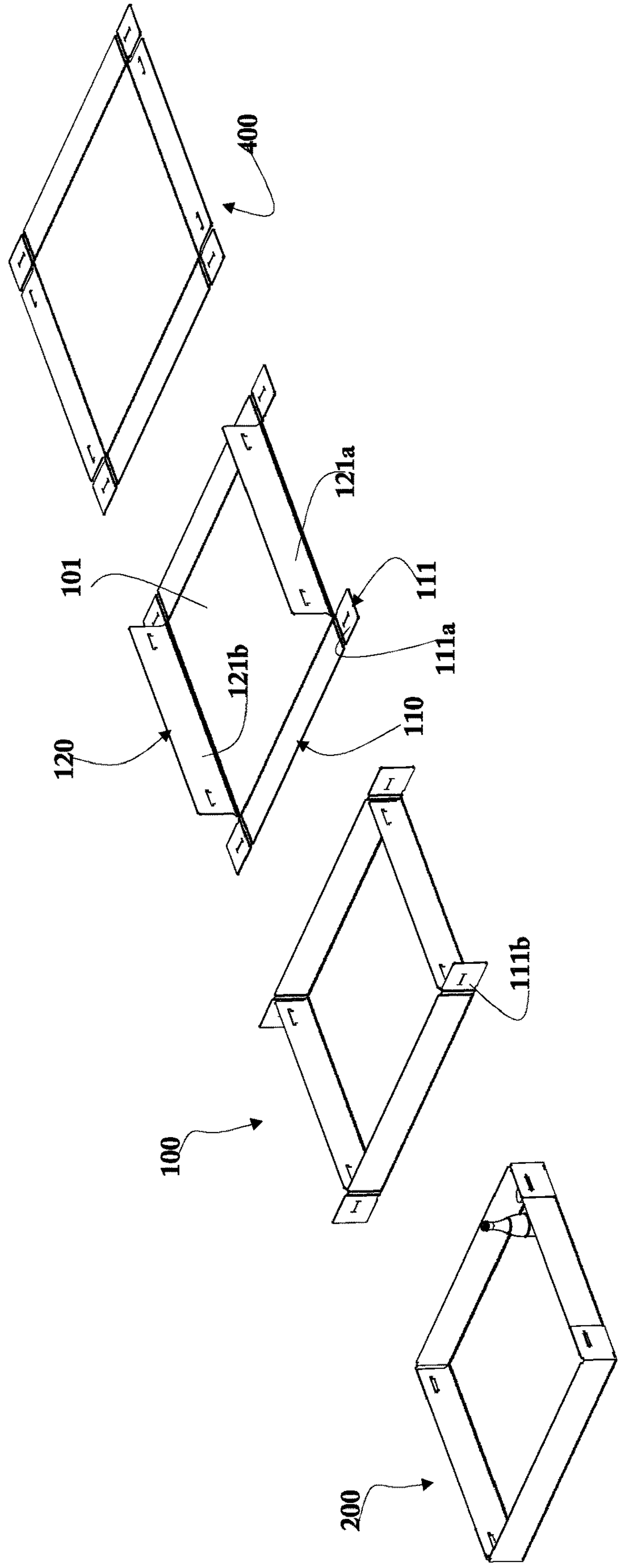
FIG. 7: an axonometric view of the possible steps of forming a packaging article according to the invention.

Thanks to this solution it is possible to guarantee an easy insertion of the containers in the tray 200 and/or cap 300 closed, since there are no obstacles inside the tray 200 and/or cap 300. In fact, with this solution, the flaps 111 are also external to the perimeter defined by the sidewalls 110, 120 as shown in FIG. 5.

According to a preferred embodiment, the female element 132 of the connection means 130 is formed on the extension flap 111.

Said female element 132 preferably comprises a slit 132*a* carved on the extension flap 111.

Therefore, during the die-cutting of the sheet 400, in addition to the fold or creasing lines, an incision is also made on the extension flap 111 adapted to define a slit 132*a*.

Said slit 132*a* remains completely inside the extension flap 111 and therefore does not extend to its edges.

According to an aspect of the invention, the female element 132 comprises at least one notch 132*b* on the side of the slit 132*a*. Said notch 132*b* preferably has a length shorter than that of the slit 132*a*.

Said notch 132*b* has the purpose of making the slit 132*a* more deformable in order to facilitate the insertion of the male 131.

Also for this purpose, the female element 132 can comprise, at the ends of the slit 132*a*, at least a further cut 132*c*, orthogonal to said slit 132*a*.

FIG. 2 shows a possible configuration of the female 132 in which the notch 132*b* is present on both sides of the slit 132*a*.

A possible embodiment of the connection means 130 provides that the male element 131 is formed in the portion 121 of the adjacent sidewalls 120.

In particular said male element 131 is shaped like a fin 131*a* carved in the portion 121 of the adjacent sidewalls 120 and connected by a fold line 131*b* to said portion 121.

On a portion of the fold line 131*b* there may be a cut adapted to make the fin 131*a* more flexible.

Said fin 131*a* is shown in FIGS. 1 and 2 with a possible embodiment which provides that said fin 131*a* comprises a first zone 131*c* having substantially the same height A as the fold line 131*b* and a second zone 131*d* which has height B greater than A, moving away from the fold line 131*b*. In particular said second zone 131*d* can comprise two teeth 131*e* which preferably project symmetrically with respect to the first zone 131*c*.

Furthermore, the height A of the first zone 131*c* is smaller than the length A' of the slit 132*a* in order to guarantee the insertion thereof. Consequently, the second zone 131*d* has height B greater than the length A' of the slit 132*a*.

Said second zone 131*d* is configured to pass the slit 132*a* when the packaging article 100 is formed.

Therefore the teeth 131*e* are wider than the slit 132*a* itself and once inserted into the slit 132*a* they prevent their removal.

Figure 3:
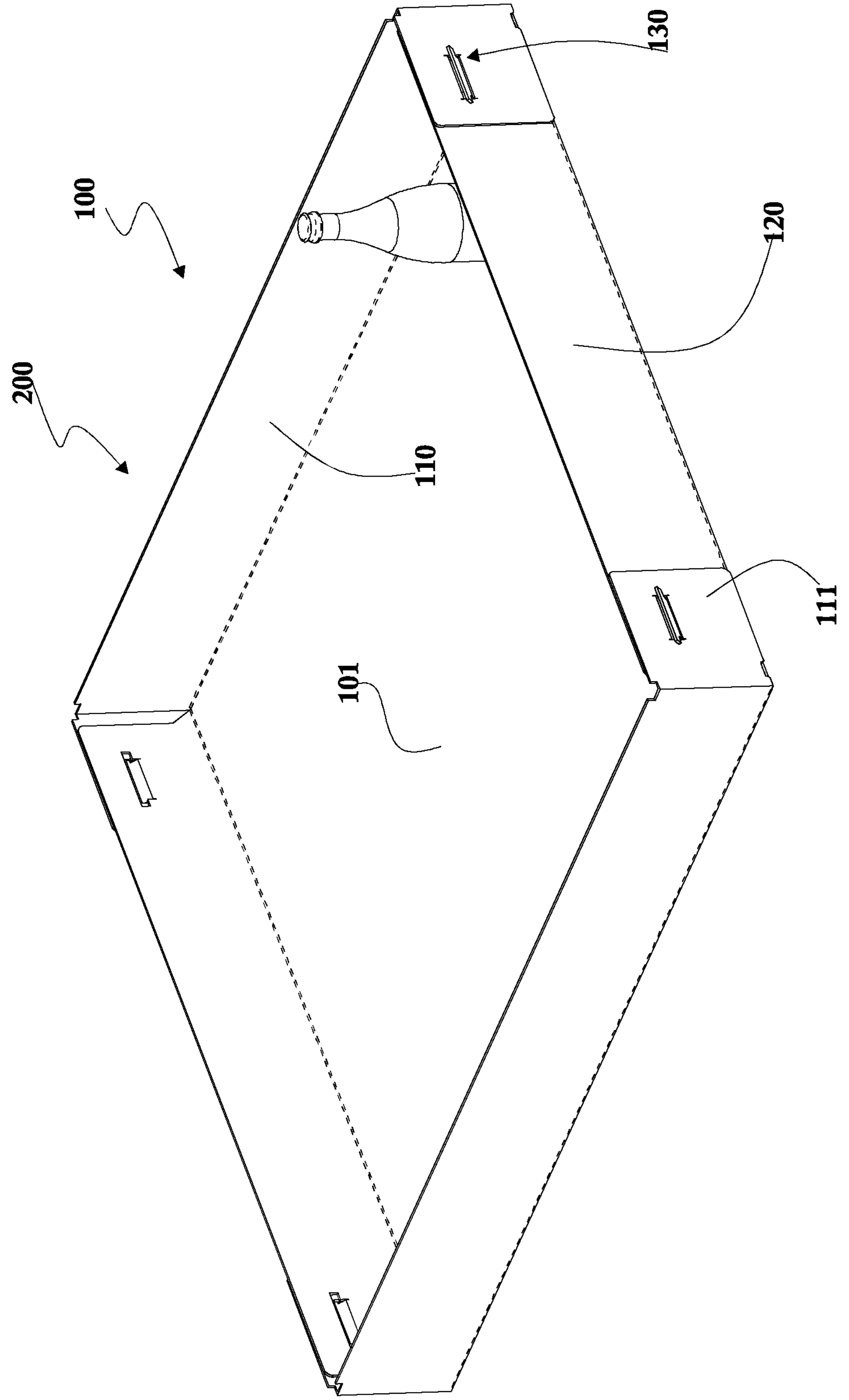
FIG. 3: illustrates an axonometric view of a tray formed according to the invention in which the containers are inserted.
Figure 4:
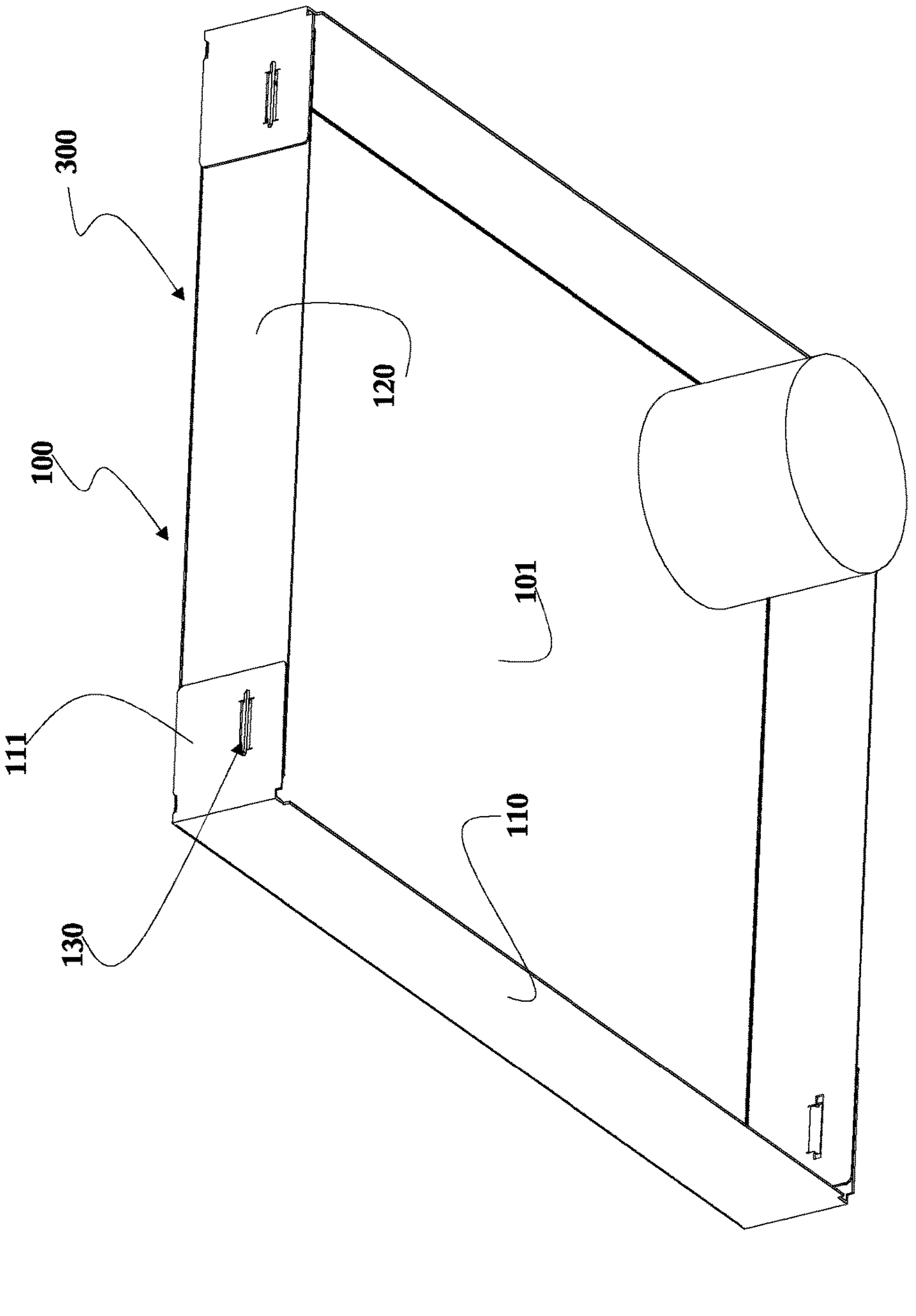
FIG. 4: illustrates an axonometric view of a cap formed according to the invention inserted on the containers.

As shown in FIGS. 1 and 3, the slit 132*a*, formed on the extension flap 111, is preferably substantially parallel to the base wall 101 when the packaging article 100 is closed or formed. Consequently, in order to be able to be inserted into the corresponding slit 132*a*, the fins 131*a* are also arranged horizontally.

Said embodiment, which provides that the slit 132*a* formed on the extension flap 111, is arranged substantially parallel to the base wall 101 of the closed packaging article 100, is particularly advantageous.

A first advantage is given by the fact that the slit 132*a* is not constrained by the height H of the extension flap 111. Therefore also in an extension flap 111 having a low height H (about 40-60 mm), which is fixed to corresponding low sidewalls 120, it is possible to make the slit 132*a* with the correct size for interlocking the male 131.

Furthermore, said configuration can preferably have two preferred embodiments.

The first embodiment is provided, in particular, when the packaging article 100 is used as a tray 200.

In this case the fins 131*a* are arranged horizontally and in such a way that the second zone 131*d* faces towards the base wall 101 of the closed tray 200.

The advantage of this first embodiment is evident when said trays 200 are used to form a pallet made up of the superposition of several trays 200, in which each tray 200 contains a layer of containers. Generally said pallets provide to be protected by a bag of plastic film which is inserted by special machines. The insertion of said bag, which has dimensions very similar to the pallet, takes place starting from the top of the pallet downwards.

The presence of horizontal slits 132*a* and of corresponding fins 131*a* protruding towards the outside from the tray 200 and in such a way that the second zone 131*d*, faces towards the base wall 101, facilitates the insertion of the bag, since this does not create obstacles to the insertion thereof, being positioned in the same insertion direction as said bag.

The second embodiment is provided, in particular, when the packaging article 100 is used as a cap 300.

In this case the fins 131*a* are arranged horizontally and in such a way that the second zone 131*d* faces moving away from the base wall 101 of the closed cap 300.

The advantage of this second embodiment is evident when said caps 300 are used to form a pallet made up of the superposition of several caps 300, wherein each cap 300 contains a layer of containers. Generally also said pallets provide to be protected by a bag of plastic film which is inserted by special machines. The insertion of said bag, which has dimensions very similar to the pallet, takes place starting from the top of the pallet downwards.

The presence of horizontal slits 132*a* and of corresponding fins 131*a* protruding towards the outside from the cap 300 and so that the second zone 131*d*, faces moving away from the base wall 101, facilitates the insertion of the bag, since this does not create obstacles to the insertion thereof, being positioned in the same direction of insertion as said bag.

Alternative positions of the slit 132*a* such as orthogonal with respect to the base wall 101, when the packaging article 100 is closed, however, fall within the scope of protection of the invention.

Said solution, shown in FIG. 2, can be advantageous for example when the height H of the extension flap 111 is high (for example about 100-300 mm) and is fixed to corresponding high sidewalls 120. Said solution allows to obtain a better tightness of the interlock, and to avoid that the sidewalls 110 and 120 tend to open.

Connection means 130 can in fact be made in such a way that they develop in the direction of the height of the sidewalls 120 and/or of the extension flap 111, so that the connection means 130 are adequate to guarantee a sufficient tightness of the fixing.

In fact, it should be considered that the packaging article 100 must maintain its shape even if subjected to any stresses present during the filling phase with containers and during the subsequent handling and storage phases.

However, any solution which may include, for example, a slit 132*a* inclined with respect to the base wall 101 of the packaging article 100 formed, or for example solutions which may provide more than one slit 132*a* and also arranged in different ways such as for example two slits 132*a* placed one orthogonal and one horizontal to the base wall 101, for example formed like a cross, fall within the scope of protection of the invention.

The same applies to different conformations of the fins 131*a* which will be shaped from time to time to connect in a removable way in the slits 132*a*.

In accordance with a further possible alternative embodiment, not shown in the figure, the packaging article 100 can provide that the flap 111 is fixed to the portion 121 in such a way that the flap 111 rests on the portion 121, remaining inside the packaging article 100. In particular said flap 111 is fixed to the portion 121 in such a way that the outer face 111*b* of the flap 111, i.e. facing towards the outside of the packaging article 100, rests on the inner face 121*b* of the portion 121, i.e. facing towards the outside of the packaging article 100.

Consequently, the female element 132 of the connection means 130 will be formed in the portion 121 of the sidewalls 120, while the male element 131 will be carved on the extension flap 111.

Also in this case the interlocking means 130 protrude facing towards the outside of the packaging article 100 and therefore do not hinder the insertion of the containers inside the tray 200 or the insertion of the cap 300 on the containers. In this solution, only the flap 111 remains inside the packaging article 100, which in any case creates a reduced encumbrance being its thickness equal to that of the die-cut sheet 400.

The spread out sheet 400 with characteristics such as to allow manufacturing the packaging article 100 according to the characteristics described above also forms the object of the invention.

The method for manufacturing a packaging article 100 by means of a sheet 400 of foldable material which provides for folding the sidewalls 110, 120 along fold lines 103 further forms an object of the invention.

Once folded, said sidewalls 110, 120 can be orthogonal or inclined with respect to the base wall 101, for example with an inclination comprised between 45°-90°.

Said method provides for folding along the fold line 113 the extension flaps 111 which protrude from the ends 112 of said sidewalls 110, arranging said extension flaps 111 in face-to-face relationship with a portion 121 of the adjacent sidewalls 120.

Said method provides for fixing each extension flap 111 on the portion 121 by exerting a thrust action on the connection means 130 of the packaging article 100, with a movement directed from the inside towards the outside of the packaging article 100, and inserting the male element 131 inside the female element 132 so that a portion of said male element 131 projects from the female element 132 towards the outside of the packaging article 100.

Said method provides for exerting the thrust action on the connection means 130 in a direction parallel and/or inclined with respect to the base wall 101.

Furthermore, it provides for exerting a contrast action to retain the walls 120 and the flaps 111 in position during the thrust action on the connection means 130.

Said method is applicable on tray forming machines both of the horizontal and vertical type known to a person skilled in the art.

The apparatus for manufacturing a packaging article 100 by means of a sheet 400 of foldable material which provides forming means for folding the sidewalls 110, 120 along fold lines 103 and folding along the fold line 113, the extension flaps 111 which protrude from the ends 112 of said sidewalls 110, arranging said extension flaps 111 in face-to-face relationship with a portion 121 of the adjacent sidewalls 120 forms the object of the invention.

The apparatus provides for fixing each extension flap 111 on the portion 121 by means of thrust devices 500 which act on the connection means 130 of the packaging article 100.

Said thrust devices 500 are configured to insert the male element 131 inside the female element 132, in particular in such a way that a portion of said male element 131 protrudes from the female element 132 towards the outside of the article of packaging 100.

To do this, the thrust devices 500 preferably move in a direction which goes from the inside towards the outside of the packaging article 100.

In particular, the thrust devices 500 exert the thrust action on the connection means 130 in a direction parallel and/or inclined with respect to the base wall 101.

Said thrust devices 500 can comprise for example at least one actuator 501 of the for example electric, pneumatic, hydraulic type, etc. for the aforesaid movement.

Further, the thrust devices 500 can comprise sliders 502 whose shape is suitable for cooperating with the connection means 130 for fixing the extension flap 111 on the portion 121.

Since the second zone 131*d* of the male element 131 has height B greater than the length A' of the slit 132*a*, the actuator 501 must act with sufficient force to ensure that the entire second zone 131*d* has passed the slit 132*a*, when the packaging item 100 is formed.

According to an aspect of the invention, the thrust devices 500 are integral with the forming means.

According to a feature of the invention, the apparatus further comprises contrasting elements configured to retain the walls 120 and the flaps 111 in position during the movement of the thrust devices 500 on the connection means 130, to carry out the insertion of the male element 131, into the female element 132.

Said thrust devices 500 are applicable on tray forming machines both of the horizontal and vertical type known to a person skilled in the art.

Thanks to said solution, the formation of the packaging article 100 does not require complex and expensive equipment.

It is understood however that what is described above has a value of non-limiting example, therefore, possible variants of detail that may be necessary for technical and/or functional reasons, are considered from now falling within the same protective scope defined by the claims indicated below.

The invention claimed is:

1. A packaging article (100), made by means of a sheet (400) of folding material, the packaging article (100) comprising a base wall (101), sidewalls (110, 120) connected with edges (102) of said base wall (101) by folding lines (103), wherein at least two opposite sidewalls (110) comprise an extension flap (111) which protrudes from ends (112) of said sidewalls (110) and is connected by a folding line (113), whereby the extension flap (111) folds, arranging itself in face-to-face relationship with a portion (121) of adjacent sidewalls (120), said packaging article (100) further comprises connection means (130) for fixing the extension flap (111) on a portion (121) of the adjacent sidewalls (120), said connection means (130) comprise a male element (131) and a female element (132) configured in such a way that a portion of the male element (131), when inserted into the female element (132), protrudes outside of the formed packaging article (100), wherein the flap (111) is fixed to the portion (121) in such a way that the flap (111) rests on the portion (121), remaining outside the packaging article (100) and wherein the flap (111) is fixed to the portion (121) in such a way that an inner face (111*a*) of the flap (111), which faces inside of the packaging article (100), rests on an outer face (121*a*) of the portion (121), that is facing towards the outside of the packaging article (100).

2. The packaging article (100) according to claim 1, wherein connection means (130) are configured for a removable type of fixing.

3. The packaging article (100) according to claim 1, wherein the male element (131) of the connection means (130) is formed in the portion (121) of the sidewalls (120).

4. Spread out sheet (400) for making a packaging article (100) according to claim 1.

5. A packaging article (100), made by means of a sheet (400) of folding material, the packaging article (100) comprising a base wall (101), sidewalls (110, 120) connected with edges (102) of said base wall (101) by folding lines (103), wherein at least two opposite sidewalls (110) comprise an extension flap (111) which protrudes from ends (112) of said sidewalls (110) and is connected by a folding line (113), whereby the extension flap (111) folds, arranging itself in face-to-face relationship with a portion (121) of adjacent sidewalls (120), said packaging article (100) further comprises connection means (130) for fixing the extension flap (111) on a portion (121) of the adjacent sidewalls (120), said connection means (130) comprise a male element (131) and a female element (132) configured in such a way that a portion of the male element (131), when inserted into the female element (132), protrudes outside of the formed packaging article (100), wherein the female element (132) of the connection means (130) is formed on the extension flap (111) and wherein the female element (132) of the connection means (130) comprises a slit (132*a*) carved on the extension flap (111) which remains spaced from the corresponding edges of said extension flap (111).

6. The packaging article (100) according to claim 5, wherein the slit (132*a*) is substantially at least one of: parallel or orthogonal or oblique with respect to the base wall (101) when the packaging article (100) is formed.

7. The packaging article (100) according to claim 5, wherein the female element (132) comprises, a cut (132*c*) at the ends, orthogonal to said slit (132*a*).

8. The packaging article (100) according to claim 5, wherein the male element (131) of the connection means (130) is a fin (131*a*) carved in the portion (121) of the adjacent sidewalls (120) and connected by a fold line (131*b*) to said portion (121).

9. The packaging article (100) according to claim 8, wherein the flap (131*a*) comprises a first zone (131*c*) which has a height (A) smaller than a length (A') of the slot (132*a*) and a second zone (131*d*), moving away from the fold line (131*b*), having a height (B) greater than (A), said second zone (131*d*) configured to pass the slit (132*a*) when the packaging article (100) is formed.

10. The packaging article (100) according to claim 9, wherein said second zone (131*d*) comprises two teeth (131*e*) which project symmetrically with respect to the first zone (131*c*).

11. A packaging article (100), made by means of a sheet (400) of folding material, the packaging article (100) comprising a base wall (101), sidewalls (110, 120) connected with edges (102) of said base wall (101) by folding lines (103), wherein at least two opposite sidewalls (110) comprise an extension flap (111) which protrudes from ends (112) of said sidewalls (110) and is connected by a folding line (113), whereby the extension flap (111) folds, arranging itself in face-to-face relationship with a portion (121) of adjacent sidewalls (120), said packaging article (100) further comprises connection means (130) for fixing the extension flap (111) on a portion (121) of the adjacent sidewalls (120), said connection means (130) comprise a male element (131) and a female element (132) configured in such a way that a portion of the male element (131), when inserted into the female element (132), protrudes outside of the formed packaging article (100), wherein the female element (132) comprises a slit (132*a*) and at least one notch (132*b*), beside the slit (132*a*), having a shorter length than the slit (132*a*).

* * * * *